United States Patent [19]

Merron

[11] Patent Number: 4,582,436
[45] Date of Patent: Apr. 15, 1986

[54] LIVE ROLLER CIRCLE FOR LARGE EXCAVATORS

[75] Inventor: Thomas S. Merron, Marion, Ohio

[73] Assignee: Dresser Industries, Inc., Dallas, Tex.

[21] Appl. No.: 527,443

[22] Filed: Aug. 29, 1983

[51] Int. Cl.[4] .......................................... F16C 19/30
[52] U.S. Cl. .................................. 384/593; 384/619; 384/621
[58] Field of Search ............... 308/222, 235, 223, 231, 308/229, 220; 384/593, 619, 621, 594, 623

[56] References Cited

U.S. PATENT DOCUMENTS

| | | | |
|---|---|---|---|
| 579,857 | 3/1897 | Bradshaw | 308/222 |
| 581,858 | 5/1897 | Grundler | 308/222 |
| 588,644 | 8/1897 | Koenig | 308/222 |
| 1,421,009 | 6/1922 | Inman | |
| 2,098,327 | 11/1937 | Hailey | 212/68 |
| 2,512,477 | 6/1950 | Bowes | 212/3 |
| 2,513,726 | 7/1950 | Huston | 212/69 |
| 3,131,818 | 5/1964 | Allin | 212/69 |
| 3,777,900 | 12/1973 | Brewer | 212/58 R |
| 3,955,684 | 5/1976 | Novotry | 212/48 |
| 3,985,406 | 10/1976 | Baron | 308/219 |
| 4,037,894 | 7/1977 | Sankey | 308/227 |
| 4,231,699 | 11/1980 | Thompson | 212/70 |
| 4,236,863 | 12/1980 | Baron | 308/227 |
| 4,239,305 | 12/1980 | Baron | 308/222 |

*Primary Examiner*—Lenard A. Footland
*Attorney, Agent, or Firm*—Barry E. Deutsch

[57] ABSTRACT

An improved live roller circle for rotatably supporting the upper frame or body of a large excavator on its lower frame or base is provided. It comprises upper and lower annular rails respectively mounted on the upper and lower frames of the machine. A plurality of tapered rollers, arranged in a circle, roll between and in contact with the rails. The rollers are nominally spaced apart by a circular cage to which the rollers are sufficiently loosely connected to allow them to self-align with respect to the rails irrespective of irregularities in the shape of alignment of the cage. A third annular rail extending around the outer circumference of the circle of rollers is also preferably provided.

8 Claims, 9 Drawing Figures

LIVE ROLLER CIRCLE FOR LARGE EXCAVATORS

This invention relates to large excavating machines which have a body or upper frame rotatably mounted on a lower frame or ground-engaging base, and more particularly concerns an improved live roller circle for rotatably supporting the upper frame on the base.

As used herein, the term "excavating machine" or "excavator" is intended to include a dragline, mining shovel, large hydraulic excavator, cross-pit conveyor, or any similar large machine used commonly in surface mining operations, which has an upper frame pivotably supported on a lower frame by a live roller circle. Depending on the particular type of excavator, the upper frame normally carries operating machinery, a boom or other eccentric load-supporting structure, or at least a cantilevered conveyor. The lower frame or base is either adapted to rest on the ground or is supported on mobile ground-engaging means. The size and weight of excavators has grown enormously over the years with many now weighing millions of pounds.

The roller circle serves as a huge anti-friction thrust bearing for the upper frame as it rotates about a central, vertical pivot shaft or "center journal" carried by the base. The loads imposed upon the roller circle are offset from the center of rotation and the points of peak loading shift about it as the upper frame rotates. The resulting uneven, constantly shifting, weight distribution presents many special problems in roller circle design and operation and has led to the use of the "live roller circle" on larger machines.

The "live roller circle" consists of a circular upper rail attached to the underside of the upper frame resting on a complete circle of rollers which in turn rest upon a circular lower rail mounted upon the top of the lower frame or base. The rollers are connected together and spaced apart by a surrounding cage. It is called "live" in order to distinguish it from slewing rings or other arrangements in common use in which bearing rollers are mounted on shafts fixed to the upper frame. Ordinarily it is made to withstand only downward compressive loads, the other potential loads (radial and upward) being taken by the center journal. A live roller circle is further distinguishable from a thrust bearing in that: a) the rails are usually made in segments and occasionally some segments are left out of the upper rail at the sides of the upper frame; and b) the centroid of the load does not remain at, or near, the center of rotation, but moves radially outward a considerable distance, even going beyond the edge of the circle in extreme instances.

Because of the enormous size of the excavators on which they are used, live roller circles are consequently very large and typically measure 10–60 feet in diameter. The individual solid steel rollers range from 8–24 inches in diameter and are usually of a comparable length. In some cases the rollers are cylindrical. However, in most cases, to compensate for the differential surface speed between the inner and outer circumferences of the roller circle, the rollers are tapered, i.e. frusto-conically shaped, having their larger diameter radially outermost. In both cases the rollers are frequently slightly crowned. In the case of roller circles having tapered rollers, there is a radially outward squeezing action on the rollers which has heretofore been restrained most commonly by providing a circumferential flange at the inner end of the roller which overlaps and rubs against the inner circumference of the rails.

Although live roller circles of the foregoing construction are generally regarded as the most suitable rotary support for large excavators, they are not without problems. A particularly troublesome problem is the excessive wear and premature failure of the rollers because they do not realize true rolling action. Although the reasons for this will be discussed more fully later, it suffices here to say it is due to the fact that the rollers have heretofore been rigidly constrained between the inner and outer rings of the cage. Since it is extremely difficult, if not impossible, to manufacture, assemble and maintain the cage rings in a true circle, the constrained rollers are often held in a non-radial alignment and forced to slide or scuff their way around the circular path.

Because of the large size of this equipment, the huge investment in it, and the operating losses incident to its downtime, the consequences of a failed roller circle are many times greater than the mere cost of damage to the parts themselves.

Therefore, it is the object of the present invention to provide an improved live roller circle for large excavators in which the life of the component rollers and rails is extended because the rollers consistently roll smoothly around the circle without skidding, and which can be reliably manufactured at an economical cost.

This has been achieved by developing a live roller circle comprising a plurality of rollers arranged to roll in a circular path between upper and lower rails, wherein the rollers are generally spaced apart from each other by a circular cage but are unconstrained by the cage from seeking true radial alignment with respect to the circular path so that they can roll properly against the rails. In one embodiment of the invention the stub pins or axles of the individual rollers pass through oversized apertures in the inner and outer cage rings such that while the cage spaces the axles apart, it does not prevent the rollers from self-aligning to the rails. In another embodiment, each roller is itself loosely fitted on its axle which is in turn restrictively connected to the cage rings. In this embodiment the roller can rotate on a different axis than that of its axle just as the axles in the previous embodiment can rotate on an axis different than the centerline of the holes in the cage segments. In both embodiments it is generally desirable to include a third outer annular rail to maintain the circularity of the set of rollers. This feature has the additional advantage of eliminating the need for the troublesome circumferential flanges and thrust washers heretofore required on the rollers themselves.

Thus while the previous attempts to deal with excessive roller wear and failure concern themselves with tighter manufacturing tolerances, more precision in machining and assembly, and using heavier, more rigid components, the invention has recognized those prior attempts were in the wrong direction. The invention has solved the problem by providing a freer fit between the rollers and the caged rings which not only minimizes or eliminates the wear and breakage of the rollers, but has the further advantage that it actually relaxes the manufacturing and assembly tolerances and need for precision and in one embodiment reduces the number of parts required. Furthermore by eliminating the need for flanges on the rollers, the rollers can now be more closely spaced enabling more of them in a given size circle. This means less load per roller permitting smaller diameter rollers and consequently more room for additional rollers. Finally the distribution of the load over a greater number of smaller rollers has led to reduced stress concentration on the machine structure supporting the rails, which has been a common maintenance problem on large excavators.

Having thus briefly discussed the invention, a more detailed discussion and description of it follows with reference to the accompanying drawings, which form part of this specification, and of which:

Figure 1:
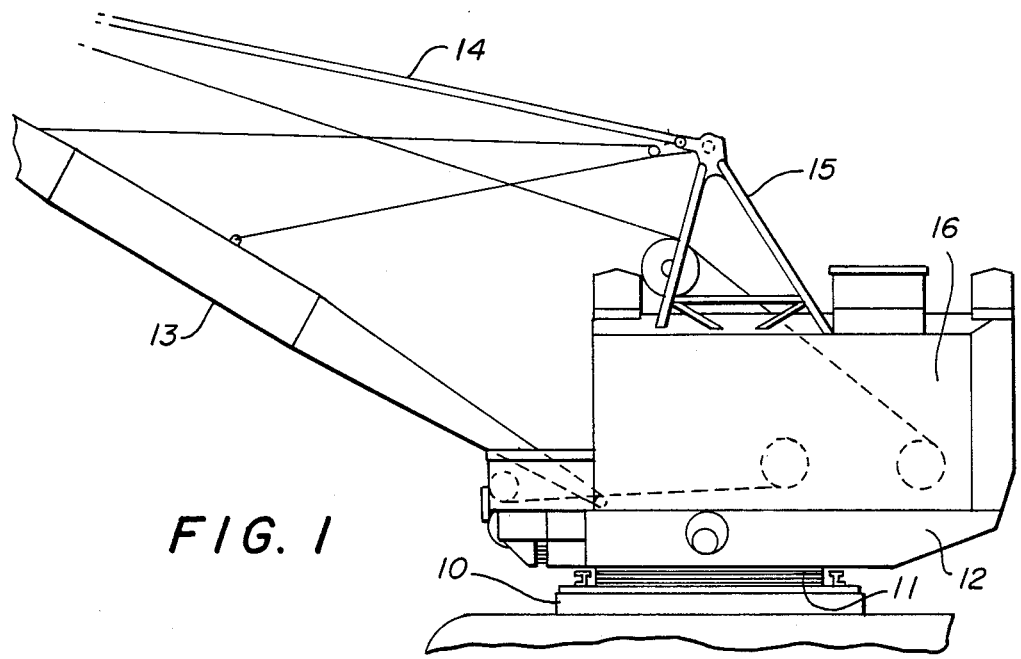
FIG. 1 is a side elevational view of a dragline machine, which exemplifies a typical excavator of the type herein concerned, embodying the present invention.

The dragline illustrated in FIG. 1 is typical of the herein concerned large excavators in that it generally includes a lower base in the form of a tub 10, a live roller circle 11 mounted on the base and an upper frame 12 mounted for rotation relative to the base on the roller circle. Connected to the front end of the upper frame 12 is one end of a boom 13. The other end of the boom 13 is supported by wire ropes 14 secured to the upper end of a gantry 15 which is mounted on the upper frame and enclosed by housing 16. Also disposed within the housing 16 and supported on the upper frame 12 is various operting machinery which typically includes: a motor-generator set, hoist and drag drums and drives, a propel system drive, a swing drive, an operator's control station and auxiliary equipment (none of which is shown).

The upper frame 12 with all of the aforementioned structure and equipment mounted thereon imposes a very large compressive load on the roller circle 11. In addition, a dragline bucket (not shown) is suspended from the distal end of the boom 13 and because of its capacity, weight and location, imposes a very large eccentric load which shifts about the roller circle 11 as the upper frame rotates or swings.

Figure 2:
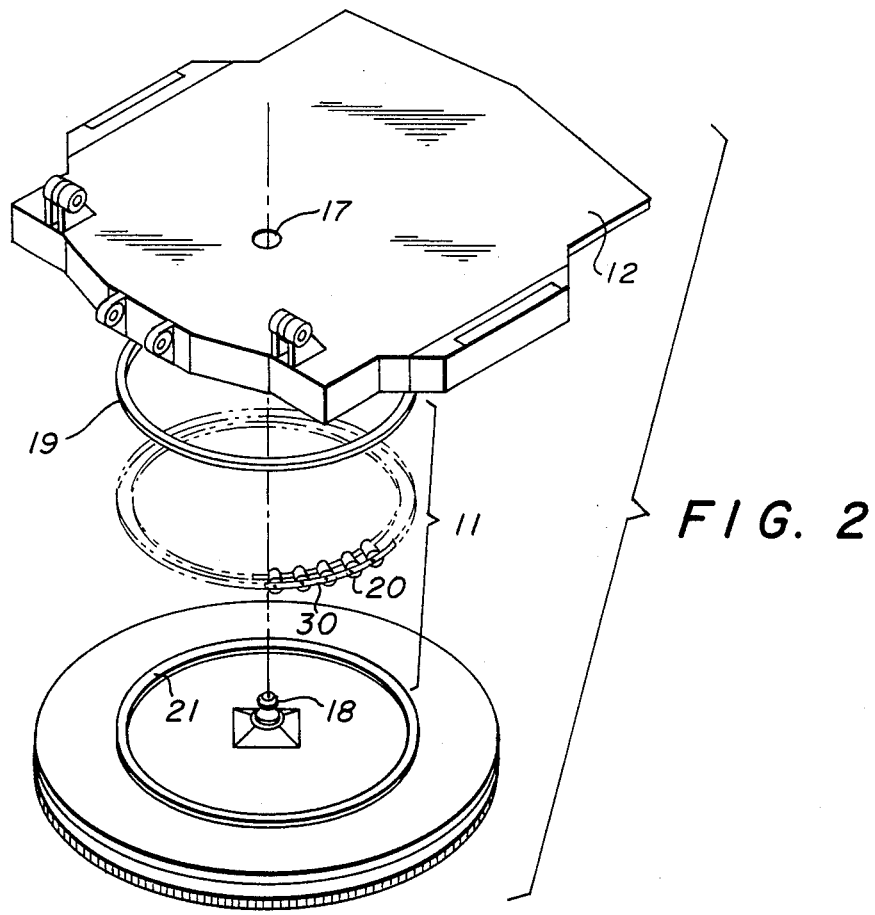
FIG. 2 is an exploded perspective view of a live roller circle supporting the upper frame of the dragline of FIG. 1 on its base.
Figure 3:
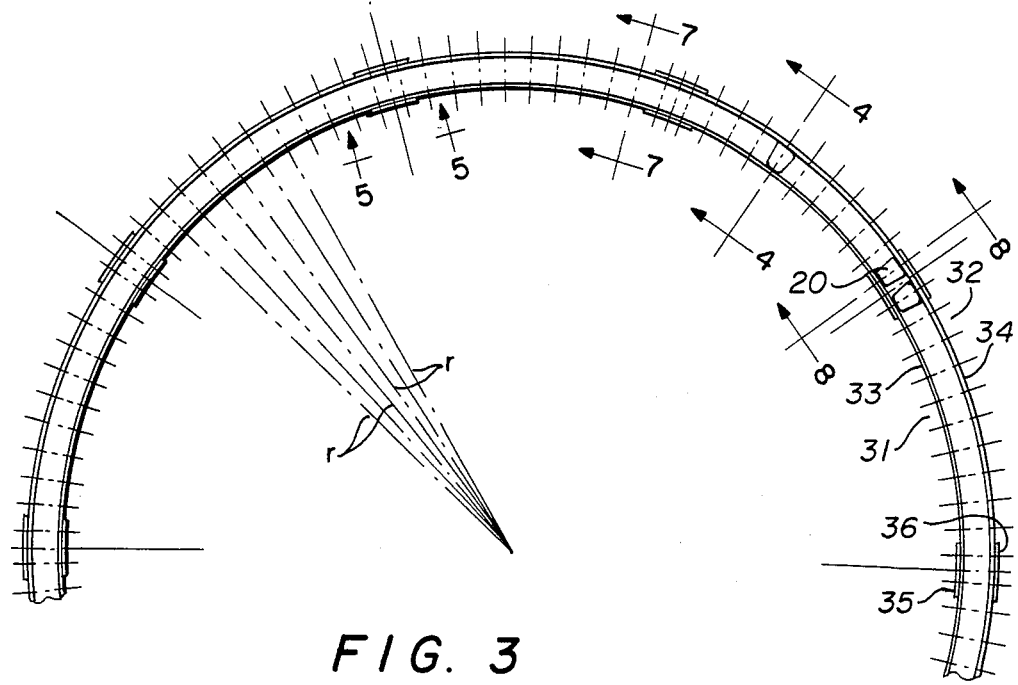
FIG. 3 is a partial plan view of the live roller circle of FIG. 2.

The live roller circle 11, which is the principal subject of this specification, is depicted generally, and in relation to the upper and lower frames of the excavator, in FIG. 2. The upper frame 12 is aperatured at 17 to receive a center journal 18 mounted on the top of the base 10. This provides the turning axle for the upper frame and house 16. The roller circle 11, which serves as the anti-friction bearing, is concentric with the turning axle. It generally consists of an upper rail 19, a plurality of rollers 20 arranged and generally held in a circle by a cage 30, and a lower rail 21. The upper rail is mounted to the bottom of the upper frame 12, and the lower rail 21 is secured to the top of the base 10. The circle of rollers is disposed between and in rolling contact with the rails 19 and 21. The cage 30 usually comprises inner and outer concentric rings 31 and 32 respectively, as shown in FIG. 3.

Also affixed to the tub 10 is a suitable ring gear 23 about which one or more pinions carried by the upper frame travel to effect rotation of the upper works.

As thus far described, the live roller circle 11 is conventional. As mentioned before, because of the enormous size of these machines, the roller circle may be as much as 60 feet in diameter. For obvious reasons relating to reasonable manufacturing capability and/or transportation, the rails and cage rings are usually made up of segments which are bolted or otherwise connected together in the field. It is usually necessary to machine the rail mounting pads on the upper and lower frames in the field before assembling the roller circle in order to insure that they are flat and concentric.

Despite the extensive effort often made, it is quite difficult, if not impossible, to manufacture and assemble a cage of true circularity. Moreover, it is even more difficult to maintain the circularity of the cage's inner and outer rings because of the huge thrust forces imposed radially on them by the wedging action of the tapered rollers 19 and the moving eccentric load from the upper frame. Even if the cage were round and concentric, it is extremely difficult to drill a plurality of roller axle mounting holes in both the inner and outer cage rings and have them accurately line-up after assembly such that the radial axis of all rollers point to the center of the circle as shown in FIG. 3. When the roller axis does not point to the center of the circle a build-in skew results, which has been shown to impose large radial forces on the cage rings in addition to those caused by the roller tapers. As a consequence, the cage rings all too readily are deformed to an out-of-round shape.

Heretofore the rollers have been tightly mounted on axles on an axis which is tightly constrained by the cage rings. As a consequence, when the cage becomes out of round the axis of at least some of the rollers become skewed relative to the true radius of the roller circle. This further adds to the problem of the induced skew caused by the manufacturing difficulties mentioned above. The result then is that the corresponding roller can't and doesn't roll true along the rails but rather slides or skids therealong leading to its excessive wear and/or premature failure.

Furthermore, as stated earlier, there is an outward thrusting force on the rollers because of their tapered shape which has heretofore frequently been resisted by circumferential flanges at the inner end of the rollers which engage and rub along the inside circumference of the upper and lower rails, and by thrust washers between the outer end of the rollers and the outer cage ring to keep the rollers in place. However the skewing of the roller axis, either by the deformation of the cage or the manufacturing tolerance or error, also causes excessive wear and breakage of these flanges and thrust washers again leads to costly repair and downtime.

The improved roller circle embodying the present invention and minimizing the aforesaid problems is shown in detail in FIGS. 3–8. As shown somewhat schematically in FIG. 3, the improved roller circle comprises a plurality of flangeless, tapered rollers 20 disposed on nominally radial axes (r) in a circular pattern between the inner and outer rings 31, 32 of a cage 30. The inner cage ring 31 is made of curved segments 33 of metal plate connected together by the overlapping links 35, and the outer cage ring 32 similar comprises curved segments 34 joined by links 36.

Figure 4:
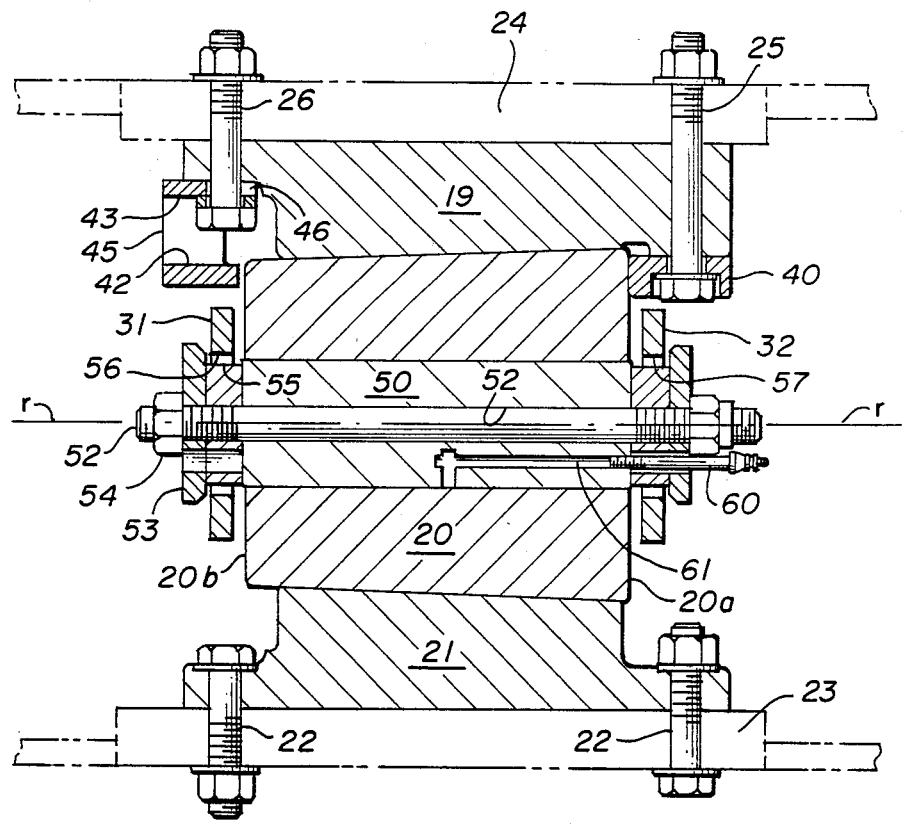
FIG. 4 is a cross-section through the live roller circle of FIG. 3, as taken along the line 4—4 in FIG. 3, and showing one embodiment of the invention.
Figure 5:
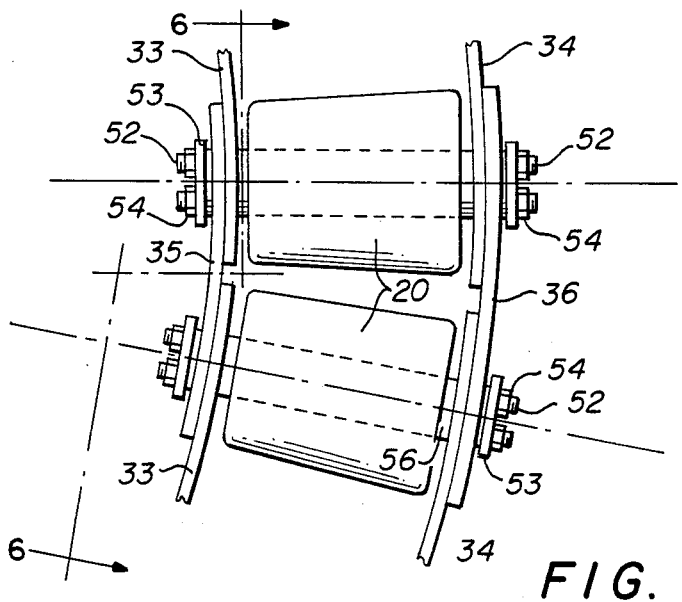
FIG. 5 is an enlarged partial plan view of the roller circle of FIG. 3 illustrating the connection between cage segments and roller pins.
Figure 6:
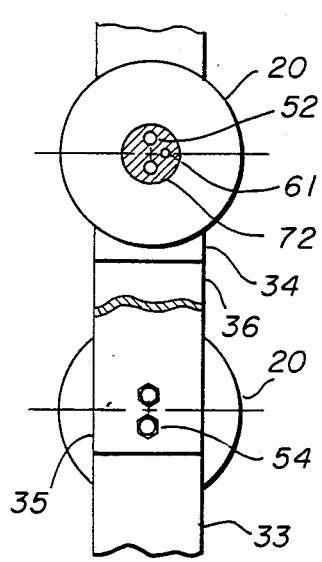
FIG. 6 is a side elevational view, partially in section, of the portion of live roller circle shown in FIG. 5.

Referring next to FIGS. 4-6, each of the tapered rollers 20 is positioned to roll between upper rail 19 and lower rail 21, both of which are machined at a bevel to match the taper of the roller. The loser rail 21 is connected to an annular pad 23 on the case 10 of the dragline by bolts 22. The upper rail 19 is secured to annular pad 24 on the upper frame 12 of the machine by bolts 25 and 26.

Replacing the previously provided circumferential flanges on the rollers, a third annular rail 40 is provided and extends around the outer circumference of the roller circle 11. It is attached to the upper rail 19 by the bolts 25. The third rail 40, which may comprise segments of curved metal plate, is positioned to engage and restrain the outer end 20a of the tapered roller to keep it in the circle despite the outward squeezing action of the mating inclined surfaces. It has also been found desirable to machine a taper on the outer end 20b of the roller and to provide a matching beveled surface on the inner circumference of the rail 40. This taper approximates a sperical radius struck from the apex of the conical surface of the roller to insure full area contact between the roller end and rail 40. This broader contact surface reduces friction and minimizes wear of the rail and roller end, which was a maintenance problem in previous installations where a thrust rail was tried.

In the case of a walking-type dragline, a fourth rail 42 may be provided along a sector of the inner perimeter of the roller circle 11 at the rear of the machine to keep rollers from sliding radially inward from between the rails when the machine is walking. This is necessary because during the walking operation the upper frame is lifted and may cause a separation of the upper and lower rails along the aforesaid portion of the roller circle. The fourth rail 42, which may consist of a pair of parallel curved bars 43 and 44 spaced apart and connected by webs 45, is connected to the upper rail by the bolts 26 which pass through slots 46 in the upper plate 43 that allow some radial adjustment of the rail.

In the embodiment of FIG. 4, the roller 20 is rotatably mounted on an axle 50 with the normal journal bearing fit. The axle 50 in turn is held in place by a pair of pins 52 which extend through the inner and outer cage rings and are secured by thrust washers 53 and nuts 54 at each end.

A grease tube 60 extends through outer cage ring 32 and in communication with an opening 61 in the axle 50 for providing lubrication to the space between the roller and axle. It has been found that excess grease squeezes out of the end of the annular space between roller and axle and flows along the end face 20b of the roller to also lubricate the inner face between the roller end 20a and third rail 40.

The axle 50 is provided at each end with a shoulder 55 having a reduced diameter. These shoulders extend through the inner and outer cage rings 31 and 32, but unlike in past practice, the fit between the ring and axle shoulder is deliberately very loose or sloppy. The apertures 56 and 57 in the cage rings 31 and 32 respectively are substantially larger in diameter than the collars 55, and the collars are also considerably wider than the thickness of the cage rings. This loose fit allows the axle 50 freedom to pivot slightly with respect to the aligned cage ring apertures 56 and 57 and thus enables the roller 20 to self-align closer to the nominal axis r for truer, smoother rolling against the rails 19 and 21 irrespective of inaccuracies in the alignment of the cage 30. However the connection is still adequate for the cage to maintain the nominal spacing of the rollers and prevent their contact with each other.

The most preferable tolerance between the cage apertures 56 and 57 and the axle collars 55 has not been precisely determined as yet, and it may well vary depending on the application. It can be generally said to be limited on the high side by the spacing between adjacent rollers and on the low side by the needed pivotal freedom of the roller as empirically determined by observation and analysis of previous comparable machines inflicted with the problems discussed earlier.

It is imperative that the collar 55 be wider than the thickness of the cage ring in order for the loose fit to have its desired effect. Also, while it is not shown in FIG. 4, for those rollers located such that their axles also extend through the cage ring connecting links 35 and 36, the corresponding openings in those connecting links should also be appropriate oversized with respect to the axle collars 55.

Figure 7:
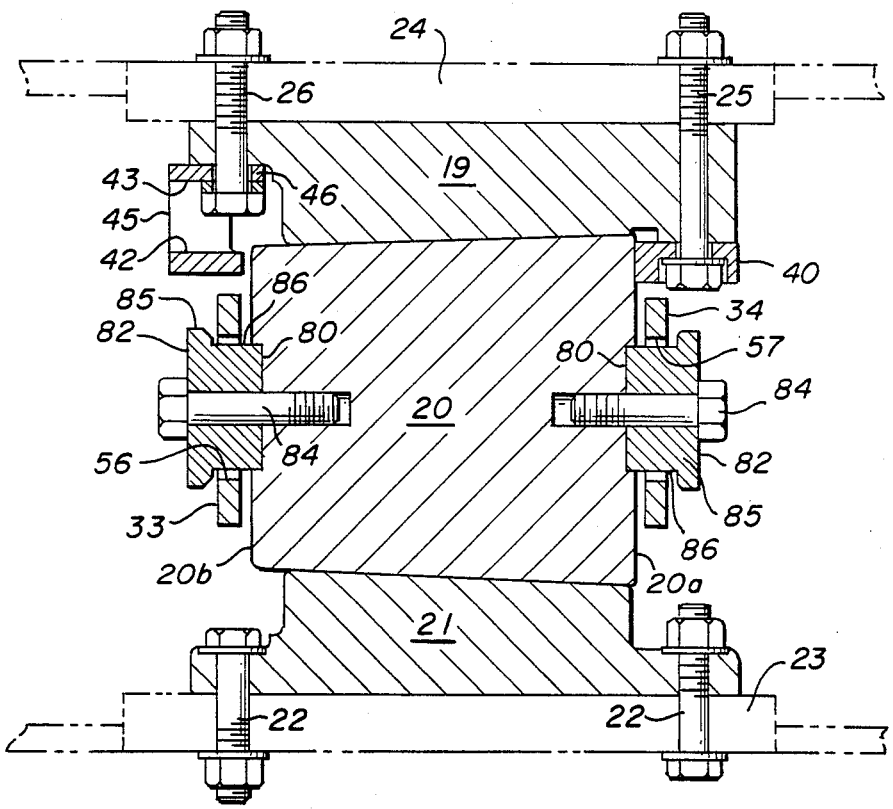
FIG. 7 is a cross-sectional view, as taken along the line 7—7 in FIG. 3, showing an alternative embodiment having a reduced number of parts.

FIG. 7 illustrates an alternative embodiment which is similar in principal to that of FIG. 4, but which employs fewer parts. Except as hereinafter pointed out, the structure shown in FIG. 7 is the same as in FIG. 4. In this embodiment the ruller 20 is substantially solid, with only shallow recesses 80 centered at each end for receiving stub axles or trunnions 82 which are bolted to the roller by bolts 84. The trunnions 82 have a journal 86 which fits with plenty of clearance through the apertures 56 and 57 in the cage rings 33 and 34 respectively. The journals 86 are substantially longer than the width of the cage rings such that the roller has some freedom in the axial direction. The trunnions 82 also have circumferentially extended flanges 85 which retain the cage rings on the hubs 86. Because there is no axle through the roller 20, the grease line 60, 61 of FIG. 4 is not needed, but some provision for lubricating the hubs 86 should be provided.

Again, with the embodiment of FIG. 7, the roller can align itself with the nominal radius r despite irregularity in the shape of the cage rings 33 and 34 or misalignment of the corresponding apertures in those rings. However, in comparison to the embodiment of FIG. 4, the trunnions 82 and bolts 84 perform the functions of axle 50, pin 52, washers 53 and nuts 54, plus eliminating the need for the grease line.

Figure 9:
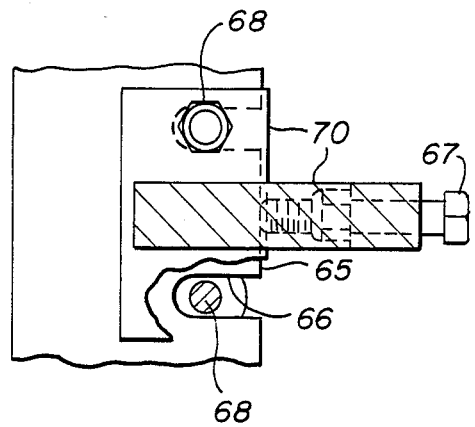
FIG. 9 is a plan view, partially sectioned, as taken along the line 9—9 in FIG. 8.
Figure 8:
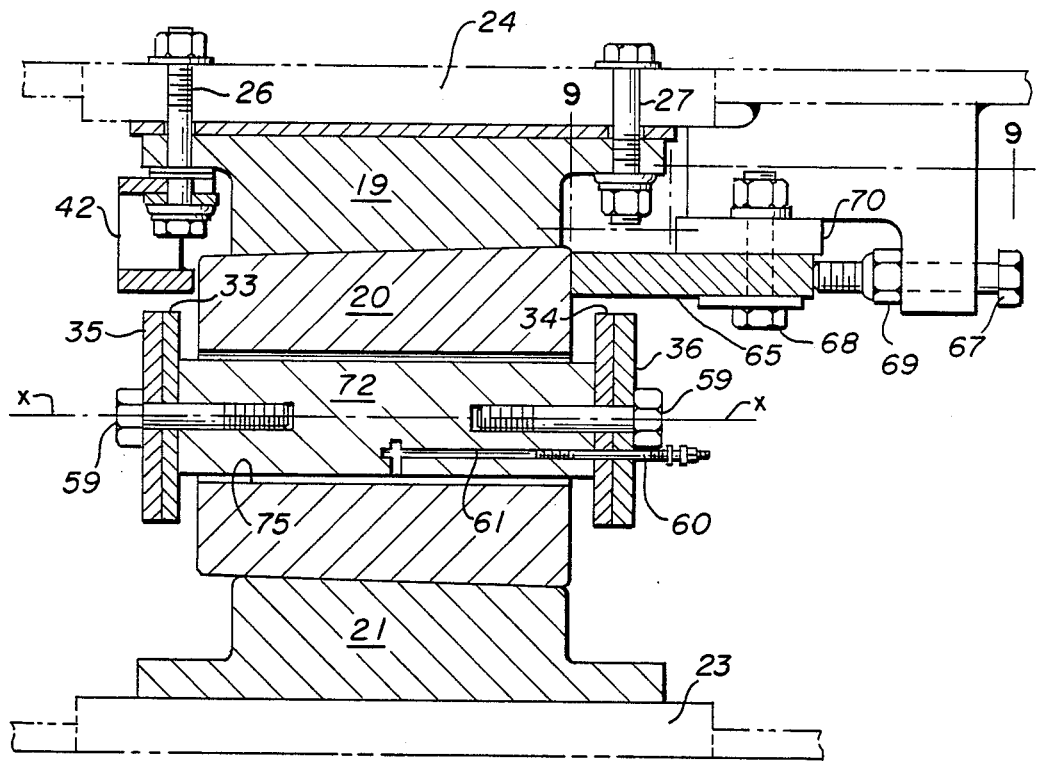
FIG. 8 is a cross-sectional view through the live roller circle of FIG. 3, as taken along the line 7—7 in FIG. 3, and showing an alternative embodiment of the invention.

Turning now to FIGS. 8 and 9, there is shown another embodiment of the invention. Here again the rollers 20 roll between upper and lower rails 19 and 21 which are respectively affixed to the upper frame 12 and lower base 10. The fourth rail 42, grease tube 60 and lubricant passage 61, are also the same as discussed in connection with FIG. 4.

However, in the embodiment of FIG. 7 the third rail 65 is connected to a bracket 70 depending from the upper frame by bolts 68. The rail 65 is provided with slots 66 through which the bolts 68 pass such that it can be radially adjusted with respect to the roller circle 11. The adjustment of the rail 65 is effected by loosening the bolt 68, turning adjusting screws 67, fixing their position with locknuts 69 and re-tightening the bolts 68.

Again the inner face of the rail 65 is preferably beveled slightly to match the previously discussed taper on the outer face 20a of the roller, and can be provided with an insert of low-friction material to further minimize wear on the roller and rail.

The axle 72 of the roller is connected to the cage ring segments 31 and 32 by a pair of bolts secured at each end by nuts 54. Where appropriate the pins 52 also extend through cage ring connecting links 35 and 36. Thus unlike FIG. 4, the roller axle 72 is constrained by the aligned apertures in the cage rings as was previous common practice. However the self-aligning capability for the roller 20 is here provided by means of a loose fit between the axle and the roller. Specifically the roller is provided with a central bore 75 substantially greater in diameter than the center section of axle 72. By way of example, a one-half inch diametrical clearance has worked satisfactorily on an early application of the invention.

In the embodiment shown in FIG. 8, the roller cage 30 spaces and constrains the axis of the roller axle 72. However because of the loose fit of the rollers 20 on their respective axles, the rollers can seek a roller axis different from the axis x—x of the axle 72 and closer to a true radial alignment r—r with respect to the roller circle.

In the case of either the embodiment of FIGS. 4, 7 or 8, it should be recognized that there is a cooperative relationship between the skewability of the roller 20 with respect to the cage 30 and the third rail 40 or 65. In either embodiment, the roller is given some degree of freedom to move in its axial direction and this can be effectively restrained by the thrust-absorbing third rail without unduly limiting the self-aligning feature. While it is recognized that the previously popular flanged rollers loosely connected to the cage can achieve self-aligning improvement without the need for adding a third rail, it is felt that the flanges rubbing against the upper and lower rails could unnecessarily damage these very expensive roller circle parts. Also, the use of flanged rollers unnecessarily limits the number of rollers that can be used in a given size roller circle. However the use of flanged rollers in combination with the third rail, while probably functionally redundant, is not precluded to those who wish to do so. In that case it is suggested that the third rail be positioned to keep the flanges normally spaced from the inner circumference of the upper and lower rails.

Having thus described a couple of embodiments of the invention, other embodiments, as well as modifications or variations of the above, will undoubtedly occur to those skilled in the art. Other means for providing a loose fit between the rollers and the cage which will suffice to maintain the nominal spacing of the rollers but allow them to self-align for truer rolling undoubtedly exist. And certainly other arrangements of the thrust-absorbing third rail, whether fixed or adjustable, can be readily envisioned.

The embodiments of the invention in which an exclusive property or privilege is claimed are defined as follows:

1. An improved live roller circle for rotatably supporting the upper body of a large excavator on its base, comprising:
   a. an annular upper rail connected to said excavator body;
   b. an annular lower rail mounted on said base congruently with said upper rail;
   c. a plurality of frusto-conical rollers in rolling contact with said upper and lower rails and carried for rotation by axles with said axles generally radially disposed;
   d. a circular cage connected to said axles for holding said rollers in spaced relationship; and
   e. means associated with said circular cage and said rollers for allowing each roller to pivot and self-align its axis of rotation to compensate for non-radial roller alignment caused by irregularity in the configuration of said cage.

2. An improved roller circle as recited in claim 11, further comprising a third rail extending around the outer circumference of said circle of rollers and positioned so as to restrain said rollers from moving radially outward of said circle.

3. An improved roller circle as recited in claim 2, wherein said third rail is mounted to either said upper rail or excavator body and is radially adjustable with respect to said circle of rollers.

4. An improved roller circle as in claim 1, wherein said means for allowing each roller to pivot and self-align its axis of rotation comprises:
   a. a pair of concentric rings forming said cage; and
   b. means for loosely coupling each end of each roller to a corresponding one of said cage rings, thereby allowing true radial alignment of each of said rollers with respect to said roller circle.

5. An improved roller circle as in claim 1, wherein said means for allowing each roller to pivot and self-align its axis of rotation comprises:
   a. a pair of concentric rings forming said cage;
   b. means for rigidly attaching each end of each of said roller axles to a corresponding one of said cage rings; and
   c. means for loosely and rotatably mounting each of said rollers on a corresponding axle thereby allowing pivoting and self-radial alignment of each of said rollers about its corresponding axle.

6. An improved live roller circle as in claim 1, wherein said means for allowing each roller to pivot and self-align its axis of rotation comprises:
   a. first and second concentric rings forming said cage;
   b. a journal receiving aperture in each of said concentric rings approximately aligned with a corresponding aperture in the other ring along a radius of the roller circle;
   c. a journal at each end of said rollers; and
   d. means for pivotally and rotatably fitting each journal in a respective aligned aperture in said cage rings thereby allowing pivoting and self-radial alignment of each of said rollers.

7. The improved roller circle recited in claim 6 further including a third circular rail connected to either the upper body or base and positioned around the outer circumference of the circle of rollers to retain said rollers in said circular arrangement against radially outward thrust forces exerted against said rollers.

8. In a live roller circle for rotatably supporting the upper frame on the lower frame of a large excavating machine having upper and lower annular rails connected respectively to the upper and lower frames, a plurality of rollers rotatably supported by axles and arranged in a circle in rolling contact with and between said upper and lower rails, and a circular cage extending around and connected to said circle of rollers through said axles to maintain a nominal spacing and radial orientation of said rollers, the improvement comprising:

a. first and second concentric rings forming said cage; and
b. means for pivotally and rotatably mounting each of said rollers between said first and second concentric rings thereby allowing pivoting and self-radial alignment of each of said rollers for the most efficient rolling action along said rails independent of irregularities in the shape or alignment of said cage.

* * * * *